May 20, 1958 C. M. SCHELL 2,835,187
AIR GRILL FOR REFRIGERATING APPARATUS
Filed Dec. 2, 1953 2 Sheets-Sheet 1

INVENTOR.
Carl M. Schell
BY
R. R. Condor
Attorney

May 20, 1958  C. M. SCHELL  2,835,187
AIR GRILL FOR REFRIGERATING APPARATUS
Filed Dec. 2, 1953  2 Sheets-Sheet 2

INVENTOR.
Carl M. Schell
BY R. R. Candor
Attorney

United States Patent Office 2,835,187
Patented May 20, 1958

2,835,187

AIR GRILL FOR REFRIGERATING APPARATUS

Carl M. Schell, Dayton, Ohio, assignor to General Motors Corporation, Detroit, Mich., a corporation of Delaware Application December 2, 1953, Serial No. 395,698

3 Claims. (Cl. 98—40)

This invention relates to refrigerating apparatus and more particularly to means for adjustably directing refrigerated air into a room.

It is an object of this invention to provide an air grill which is capable of directing the air in any desired direction.

It is another object of this invention to provide an air grill which may be manufactured at a low cost.

A further object of this invention is to provide an air outlet grill which does not cause condensation to form thereon.

Still another object of this invention is to provide an adjustable air grill made of one piece of molded material.

More particularly it is an object of this invention to provide an air grill made of flexible material and so constructed and arranged that the distortion of the grill is utilized in controlling the direction of air flow.

Further objects and advantages of the present invention will be apparent from the following description, reference being had to the accompanying drawings, wherein a preferred form of the present invention is clearly shown.

Figure 1:
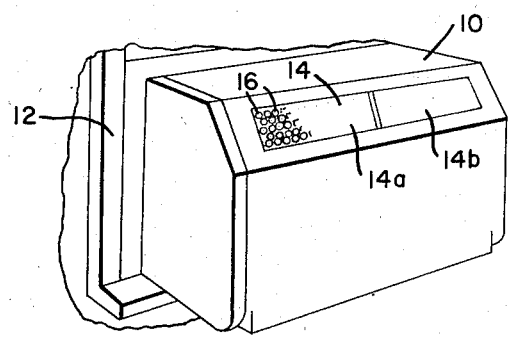
Figure 1 is a perspective view showing a window air conditioning unit equipped with an air grill constructed in accordance with the invention.
Figure 2:
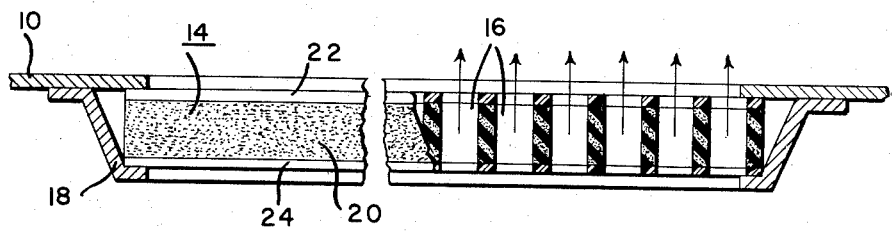
Figure 2 is an end elevational view of the grill and its support with parts broken away showing a preferred embodiment of the grill.

For purposes of illustration, the invention has been shown applied to a window type air conditioning unit whereas it is equally applicable for use in other types of air handling installations.

Referring now to the drawing wherein a preferred embodiment of the invention has been shown, reference numeral 10 generally designates an air conditioning unit of the type which is adapted to be mounted in a window opening 12 in accordance with usual practice. This unit is provided with a conditioned air outlet grill 14 through which the conditioned air discharges into the room. The air outlet shown is long and narrow and includes two similar air grill sections mounted side by side. The number of sections used may be varied and in many installations a single section would serve the desired purpose. Each air grill section comprises a one piece molded element made of elastomeric material having a plurality of air passages or perforations 16 provided in the material as shown. Foam or blown sponge made from compounded butadiene styrene copolymers, butadiene acrylonitrile copolymers, polychloroprene, natural rubber or compatible mixtures thereof, or any other well known synthetic could be used in making the grill.

Figure 3:
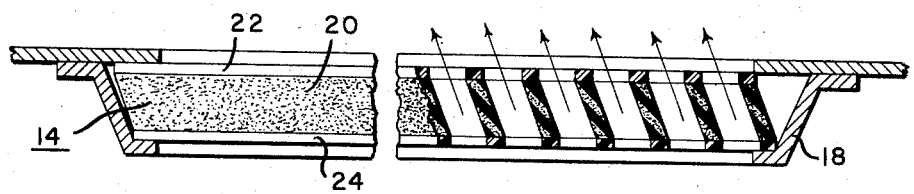
Figure 3 is a view similar to Figure 2 but showing the air grill distorted so as to direct the air at an angle to the face of the grill.

The grill is held in place against the inner wall of the cabinet 10 by means of a bracket 18 which slightly compresses the elastomeric material of the grill so as to hold the grill in any desired adjustment. The direction of air flow may be varied by distorting the body of the grill as shown in Figure 3 of the drawing. Thus, by displacing the front face of the grill relative to the rear face of the grill the air passages through the grill become distorted so as to deflect the air from its normal path. Since the grill is made of elastomeric material and is free to be distorted in any desired direction it is obvious that the angle of discharge can be universally adjusted. The friction between the face of the grill and the inner surface of the cabinet holds the grill in that position in which it is moved. The direction of air flow may be manually adjusted by placing one's hand against the face of the grill and shifting the face of the grill to any desired position.

Figure 4:
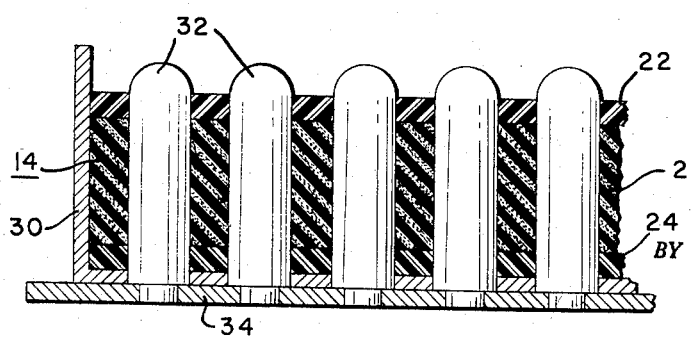
Figure 4 is a fragmentary sectional view showing the mold used in manufacturing the grill shown in Figures 2 and 3.

The material from which the grill is made is broadly immaterial so long as the walls of the air passages can be flexed. It is preferred to use rigid or semi-rigid plastic plates 22 and 24 for the front and rear faces of the grill. The grill is preferably made by inserting the perforated plate 24 into the bottom of a mold 30 which has removable pins 32 extending upwardly from the bottom of the mold. The pins extend through the perforations in the plate 24 as shown in Figure 4. Liquid foam rubber is then poured into the mold to the desired depth so as to surround the pins 32 in accordance with standard practice in moulding perforated foam rubber products. The perforated plate 22 is then placed on top of the foam rubber material 20 before the material begins to cure. The assembly is then subjected to usual heat treatment so as to cure the foam rubber before the pins 32 carried by the plate 34 are pulled out from the bottom of the mold 30. After the pins 32 have been removed the grill is then removed from the mold and is ready for installation adjacent the air outlet. While the plates 22 and 24 are not made of foam material they may be made of any of the same general materials used in making the foam material.

As shown in Figure 1 of the drawing two sections 14a and 14b are placed side by side so as to enable one to direct one portion of the air in one direction and another portion of the air in another direction. For purposes of illustration only two grill sections have been shown whereas any number of grill sections can be used depending upon the type of installations and the direction of air flow desired.

Figure 5:
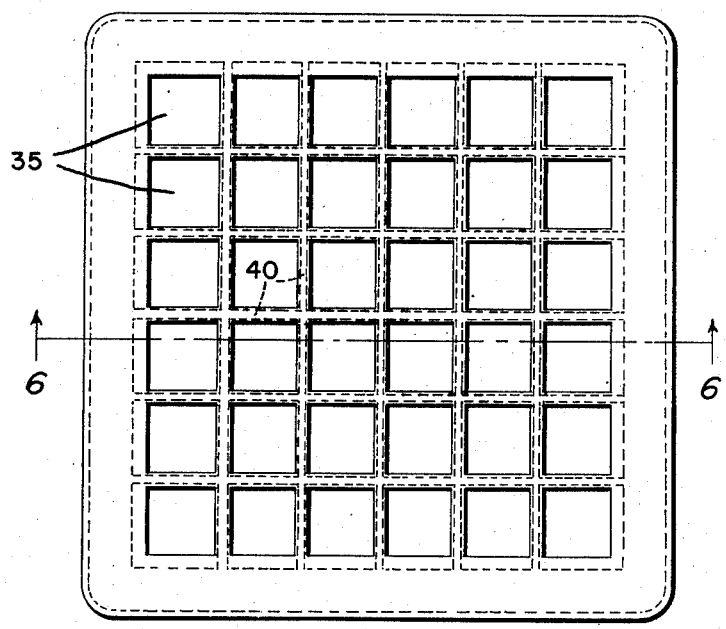
Figure 5 is a plan view of a modified air grill construction.
Figure 6:
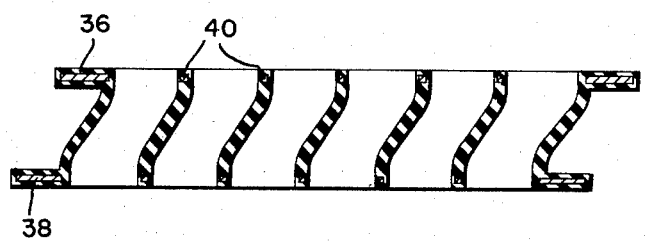
Figure 6 is a sectional view taken substantially on line 6—6 of Figure 5 showing the grill arranged to discharge the air towards one side.

In Figures 5 and 6 of the drawing there is shown a slightly modified air grill arrangement wherein the air passages 35 are square in cross section. In this modification a metal plate 36 is mounted into the front face of the grill and a corresponding metal plate 38 is mounted into the back face of the grill. The plates 36 and 38 are provided with crossbars 40 which reinforce the grill at the opposite face thereof. Any suitable elastomeric material such as those mentioned hereinabove may be used in manufacturing the grills shown in Figures 5 and 6. The relatively low thermal conductivity of the elastomeric material helps to reduce the tendency for condensate to form adjacent the air outlet. While the grills shown herein are of the type in which manual pressure is applied to the face of the grill to change the setting thereof it is obvious that any type of grill distorting means could be used. If desired, the foam rubber grill may be sprayed with or dipped in liquid latex to present a nonporous surface to the air or the mold used in making the grill may be precoated with liquid latex so as to provide a nonporous skin on the foam rubber grill.

While the form of embodiment of the invention as herein disclosed constitutes a preferred form, it is to be understood that other forms might be adopted, as may come within the scope of the claims which follow.

What is claimed is as follows:

1. An air grill comprising an elastomeric element forming a plurality of elongated air passages extending from the rear face thereof to the front face thereof, said faces being shiftable relative to one another so as to vary the shape of said air passages, said air grill comprising a rigid reinforcing plate adjacent one face thereof.

2. An air grill comprising an elastomeric element forming a plurality of elongated air passages extending from the rear face thereof to the front face thereof, said faces being shiftable relative to one another so as to vary the shape of said air passages, said air grill comprising a rigid reinforcing plate adjacent one face thereof, said reinforcing plate comprising a stamped sheet metal element coated with material having a lower coefficient of heat transfer than said metal element.

3. In an air grill, a one-piece elastomeric element having air passages extending through said element from the rear face thereof to the front face thereof, said element being deformable whereby movement of one of the said faces relative to the other of said faces distorts said air passages, said element including relatively rigid plates at the front and rear faces of said element, and frame means for supporting said elastomeric element, said frame means having surfaces thereon for engaging the opposite edge portions of said elastomeric element and for holding said elastomeric element in compression so as to frictionally hold said rigid plates in a given relative position.

References Cited in the file of this patent

UNITED STATES PATENTS

| | | |
|---|---|---|
| 1,895,731 | Prenzel | Jan. 31, 1933 |
| 1,957,040 | Gerlofson et al. | May 1, 1934 |
| 2,282,572 | Graham | May 12, 1942 |
| 2,341,499 | Cunningham | Feb. 8, 1944 |
| 2,441,819 | Jensen | May 18, 1948 |
| 2,467,309 | Hart et al. | Apr. 12, 1949 |
| 2,469,955 | Eberhart | May 10, 1949 |
| 2,639,519 | Polk et al. | May 26, 1953 |
| 2,642,792 | Reichelderfer | June 23, 1953 |